United States Patent
Mackowiak et al.

(10) Patent No.: US 10,759,365 B2
(45) Date of Patent: Sep. 1, 2020

(54) POWER ELECTRONICS MODULE AND HYBRID MODULE WITH AN ELECTRICAL SIGNAL AND/OR CLUTCH ACTUATOR CONNECTION

(71) Applicant: Schaeffler Technologies AG & Co. KG, Herzogenaurach (DE)

(72) Inventors: Stefan Mackowiak, Malsch (DE); Cedric Blaes, Munchhausen (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 567 days.

(21) Appl. No.: 15/036,085

(22) PCT Filed: Nov. 3, 2014

(86) PCT No.: PCT/DE2014/200613
§ 371 (c)(1),
(2) Date: May 12, 2016

(87) PCT Pub. No.: WO2015/078462
PCT Pub. Date: Jun. 4, 2015

(65) Prior Publication Data
US 2016/0272134 A1    Sep. 22, 2016

(30) Foreign Application Priority Data

Nov. 26, 2013    (DE) .................. 10 2013 224 109

(51) Int. Cl.
*B60R 16/03* (2006.01)
*B60R 16/02* (2006.01)
(Continued)

(52) U.S. Cl.
CPC ................ *B60R 16/03* (2013.01); *B60K 6/22* (2013.01); *B60R 16/0207* (2013.01);
(Continued)

(58) Field of Classification Search
CPC .......... B60K 6/387; B60K 6/40; B60K 17/02; B60K 6/22; B60K 6/26; B60K 6/38;
(Continued)

(56) References Cited

U.S. PATENT DOCUMENTS 5,895,207 A * 4/1999 Burgdorf ................ B60T 8/368
417/410.1
6,144,127 A * 11/2000 Heise ..................... B60T 8/368
310/68 R
(Continued)

FOREIGN PATENT DOCUMENTS

CN    1860662 A    11/2006
CN    102416859    4/2012
(Continued)

*Primary Examiner* — Jared Fureman
*Assistant Examiner* — Emmanuel Dominique
(74) *Attorney, Agent, or Firm* — Davidson, Davidson & Kappel, LLC

(57) ABSTRACT

A power electronics module for operating a hybrid module for a hybrid drive unit wherein the power electronics module includes a power electronics module-side electrical signal and/or clutch actuator connection that includes a power electronics module-side contact device connected to the power electronics module for a direct connection to a hybrid module-side contact device, provided on the hybrid module, of a hybrid module-side electrical signal and/or clutch actuator connection is provided. A hybrid module and to a method for assembling a hybrid module is also provided.

20 Claims, 5 Drawing Sheets

(51) Int. Cl.
  *B60K 6/22* (2007.10)
  *F16D 48/06* (2006.01)
(52) U.S. Cl.
  CPC ....... *B60Y 2200/92* (2013.01); *B60Y 2400/40* (2013.01); *F16D 48/06* (2013.01); *Y10S 903/904* (2013.01)
(58) Field of Classification Search
  CPC ......... B60K 6/485; B60R 16/03; F16D 48/00; F16D 28/00; H02K 5/22; H02K 11/33; B60W 20/00; H02M 1/00
  See application file for complete search history.

(56) References Cited

U.S. PATENT DOCUMENTS

| | | |
|---|---|---|
| 2005/0250618 A1 | 11/2005 | Colvin et al. |
| 2007/0013882 A1 | 1/2007 | Dodoc et al. |
| 2010/0025131 A1* | 2/2010 | Gloceri .................... B60K 6/52 180/65.28 |
| 2011/0153134 A1 | 6/2011 | Roco et al. |
| 2011/0212642 A1* | 9/2011 | Franke .................... H01R 12/83 439/326 |
| 2013/0099609 A1* | 4/2013 | Ikeno ..................... H02K 11/33 310/52 |
| 2014/0315682 A1 | 10/2014 | Helmer et al. |

FOREIGN PATENT DOCUMENTS

| | | | |
|---|---|---|---|
| DE | 102008052254 | | 4/2010 |
| DE | 102009002265 | | 10/2010 |
| DE | 10 2012 222 110 A1 | | 6/2013 |
| JP | 2008211945 | | 9/2008 |
| JP | 2010206869 | | 9/2010 |
| WO | WO 1999002361 | * | 1/1999 |
| WO | WO-1999002361 A1 | * | 1/1999 ............. F16D 23/12 |

* cited by examiner

POWER ELECTRONICS MODULE AND HYBRID MODULE WITH AN ELECTRICAL SIGNAL AND/OR CLUTCH ACTUATOR CONNECTION

The invention relates to a power electronics module and to a hybrid module for machines with a hybrid drive, in particular for vehicles with a hybrid drive, which include a combination of an electronic drive and a combustion engine.

BACKGROUND

The valuable prior art DE 10 2012 222 110 A1 discloses a clutch device with an actuator for a drive train of a motor vehicle comprising an internal combustion engine, an electrical machine with a stator and a rotor, and a transmission device, wherein the clutch device is disposed between the internal combustion engine on the one hand and the electrical machine as well as the transmission on the other hand, wherein the clutch device and the actuator are integrated into the rotor of the electrical machine to provide a constructional/functional improvement of the clutch device.

SUMMARY OF THE INVENTION

An object of the present invention is to provide further improvements of the prior art, for example to reduce costs and/or the complexity of the assembly and/or to increase the operational reliability.

The present invention provides a power electronics module for operating a hybrid module for a hybrid drive unit wherein the power electronics module has a power electronics module-side electrical signal and/or clutch actuator connection that includes a power electronics module-side contact device connected to the power electronics module for a direct connection to a hybrid module-side contact device, provided on the hybrid module, of a hybrid module-side electrical signal and/or clutch actuator connection.

present invention provides a hybrid module for a hybrid drive unit wherein the hybrid module includes a hybrid module-side electrical signal and/or clutch actuator connection that includes a hybrid module-side contact device connected to the hybrid module for a direct connection to a power electronics module-side contact device, provided on a power electronics module, of a power electronics module-side electrical signal and/or clutch actuator connection.

The present invention also provides a method for mounting/assembling a hybrid module for a hybrid drive unit wherein a power electronics module-side contact device, connected to a power electronics module, of a power electronics module-side electrical signal and/or clutch actuator connection is directly connected to a hybrid module-side contact device, provided on the hybrid module, of a hybrid module-side electrical signal and/or clutch actuator connection.

This provides a simple contact for the signals and/or clutch actuator lines between the power electronics module and the hybrid module. This saves cabling, a fact which reduces costs on the one hand and increases reliability (because cables are prone to defects, for instance in the case of an accident or unintentional manipulation).

A hybrid module is preferably a coupling module including an e-motor (electric motor) as an electric drive unit and preferably a clutch, preferably a disconnect clutch, in particular including an additional damper system. It is preferably arranged axially between a combustion engine and the power take-off side, for instance wheels, preferably with a transmission connected between the hybrid module and the power take-off side. The hybrid module is preferably a motor vehicle hybrid module. The hybrid module preferably includes a hybrid module housing. A hybrid module housing is preferably a cover at least partly surrounding the electrical drive unit and/or at least partly surrounding the clutch of the hybrid module. In accordance with a particularly preferred aspect, the hybrid module housing surrounds the electrical drive unit and/or the clutch so as to seal it against a fluid such as a cooling fluid. The hybrid module housing preferably includes one or more cooling fluid channels. A fluid flows, preferably circulates, through these cooling fluid channels. The hybrid module preferably has an electric motor power connection and/or an electrical signal and/or clutch actuator connection and/or a coolant connection, and at least one, preferably two, in particular all of these connections is/are directly connected to a corresponding power electronics module-side connection. For instance, the electric motor power connection, preferably also the electrical signal and/or clutch actuator connection, in particular also the coolant connection is/are directly connected to a corresponding power electronics module-side connection.

An electric motor power connection is preferably a connection conducting a current for the operation of the electric drive motor of the hybrid module, for instance to the stator and/or rotor of the electric motor. The electric motor connection is preferably a high power interface. The latter is preferably equipped to transmit electrical power of a minimum of 10 W, preferably a minimum of 100 W, in particular a minimum of 1000 W or more peak wattage or preferably continuous wattage. It is preferably an electric motor power connection. The power for the operation of the electric motor is preferably transmitted via the high-power interface, which is preferably designed for peak voltages, preferably alternating voltages, of a minimum of 48 V, preferably a minimum of 100 V, in particular a minimum of 350 V or more with currents of up to 400 A.

An electrical signal and/or clutch actuator connection is preferably a connection that includes at least one signal line (for instance for control and/or measurement signals such as a rotor position sensor signal, a rotor rpm sensor signal, a temperature sensor signal, a position sensor signal of the clutch actuator, a control signal for the clutch actuator/the clutch actuating system) and/or at least one power supply for the clutch actuator. This connection is preferably a low-power interface, in particular a low-voltage interface. The latter is preferably designed to transmit control signals and/or electrical power of up to 100 W, preferably up to 10 W, in particular up to 5 W of peak wattage, preferably continuous wattage. Control signals and/or sensor signals for the clutch or the electric motor and/or the power supply for the operating device of the clutch of the hybrid module are preferably transmitted via the low-power interface.

A hybrid drive unit is preferably a combined drive unit with two different drive units, for instance a combustion engine and an electric motor.

A power electronics module is preferably a combination of different components controlling (potentially in a closed loop) a power supply to the electric motor of the hybrid module, and preferably includes the peripheral components required for this purpose such as cooling elements or mains adapters. The power electronics module in particular contains power electronics/one or more power electronics components equipped to control (potentially in a closed loop) a current. In accordance with a particularly preferred aspect, these components are one or more power switches, for instance power transistors. In accordance with a particularly preferred aspect, the power electronics include more than two, in particular three, separate phases/current circuits, each having a minimum of one individual power electronics component. The power electronics is preferably dimensioned to control (potentially in a closed loop) a power of a peak wattage, preferably a continuous wattage, of a minimum of 10 W, preferably a minimum of 100 W, most preferably a minimum of 1000 W. The power electronics module is preferably disposed on a component of the hybrid module, for instance on the hybrid module housing, preferably on a hybrid module component located inside the hybrid module housing, for instance a stator plate. The power electronics module is preferably pre-mounted to the component of the hybrid module before the hybrid module is mounted into the hybrid drive unit, for instance before the hybrid module is mounted in the engine region of a motor vehicle.

The power electronics module preferably additionally includes control electronics and/or sensor electronics for the hybrid module, for instance a control device (such as an actuator control unit, ACU) for the clutch actuator, for instance an electrical concentric actuator. The power electronics module preferably includes an electrical signal and/or clutch actuator connection and/or a coolant connection, each of which is directly connected to a corresponding hybrid module-side connection.

The hybrid module may be operated by means of the power electronics module, preferably in that the power electronics module supplies power to the hybrid module, for instance to a stator coil of the electric motor.

"Hybrid module-side" is preferably understood to indicate that relative to the interface between the hybrid module and the power electronics module, the component it describes is located on the side of the hybrid module and is thus assigned to the hybrid module. "Power electronics module-side" is preferably understood to indicate that relative to the interface between the hybrid module and the power electronics module, the component it describes is located on the side of the power electronics module and is thus assigned to the power electronics module.

A contact device is preferably a device that, in interaction with another contact device, creates galvanic contact by a direct connection with the other contact device, i.e. preferably without a cable connected in between the two contact devices. A contact device is preferably embodied as a plug device. A plug device preferably forms a plug-in connection. A plug device preferably includes at least one plug element and/or at least one bush element. The respective contact device is preferably connected to the power electronics module or to the hybrid module in a wireless way. The contact device preferably includes at least one conductor element. The power electronics housing preferably includes a recess for the power electronics module-side and/or the hybrid module-side conductor element. The hybrid module housing preferably has a recess for the power electronics module-side and/or the hybrid module-side conductor element. In the hybrid module-side contact device, cables coming from the clutch actuator and resolver and temperature sensors are preferably provided on one plug and/or bush. Depending on the size of the connecting elements, this may be more suitable in the installation space. The contact device preferably includes a number of plug devices, for instance preferably a 10-pole plug for the clutch actuator as well as preferably a 10-pole combined plug, preferably including additional plug shielding, for the rotor position sensor and for one or two (NTC) temperature sensors. On the power electronics side, the contact device is preferably a bush on a circuit board for the clutch actuator, the rotor position sensor, and one or two (NTC) temperature sensors.

"For a direct connection" preferably means that the connected connections or parts (e.g. contact devices) of the connected connections are in contact, preferably with a sealing element connected in between, in particular exclusively with a sealing element connected in between or completely without any component/element connected in between.

If in the following a "respective" unit is mentioned in the context of a module (e.g. hybrid module), a reference is made to the unit of the corresponding other module (e.g. power electronics module).

In a further power electronics module of the invention, the power electronics module-side contact device is preferably fixed directly to the power electronics module. In a further hybrid module of the invention, the hybrid module-side contact device is fixed, preferably directly, to the hybrid module. In a further method of the invention, the power electronics module-side contact device is fixed to the power electronics module and/or the hybrid module-side contact device is fixed to the hybrid module; in each case, the connection is preferably a direct connection, in particular a wireless connection, and is implemented before the contact devices are connected to one another.

This allows a contacting point to be mounted in the respective module, for instance as an integral part, or a fixed interface to be created, which automatically establishes contact when the modules are joined. The contact device is preferably screwed and/or glued to the respective module or is embodied an integral part of the housing of the respective module. The respective contact device is for instance rigidly or at least elastically fixed to a component, e.g. the housing, of the respective module.

In a further power electronics module of the invention, the power electronics module is arrangeable on a component of the hybrid module and, due to an arrangement of the power electronics module on the component, contact, preferably an engagement, is establishable between the power electronics module-side contact device and the hybrid module-side contact device. In a further hybrid module of the invention, the power electronics module is arrangeable on a component of the hybrid module and, due to an arrangement of the power electronics module on the component, contact, preferably an engagement, is establishable between the power electronics module-side contact device and the hybrid module-side contact device. In a further method of the invention, contact, preferably an engagement, is established between the power electronics module-side contact device and the hybrid module-side contact device due the arrangement of the power electronics module on the component.

This provides an easy assembly and reliable contact. In addition, the stability of the connection between the hybrid module and the power electronics module is preferably increased by the mutual engagement, for instance if the contact device is embodied as a plug device. The power electronics module is preferably disposed on the hybrid module, providing mutual engagement of the contact devices. A component of the hybrid module on which the power electronics module is arranged for instance, the hybrid module housing, preferably a hybrid module component located in the hybrid module housing such as a stator plate.

In a further power electronics module of the invention, the power electronics module-side contact device, which is preferably mounted to a circuit board, is located at least partly in a power electronics housing of the power electronics module. In a further hybrid module of the invention, the hybrid module housing of the hybrid module has a first housing region preferably adjacent to a space receiving a clutch of the hybrid module, out of which first housing region the hybrid module-side contact device is guidable and is preferably guided through an opening of the first housing region. In a further method of the invention, the hybrid module-side contact device is guided out through an opening of the first housing region.

The hybrid module-side contact device is preferably connected to a cable end guided out through the opening of the first housing region. The opening is preferably a cavity in the hybrid module housing. Preferably there is a pure cable connection, i.e. a cable connection without any further plug connection, between the hybrid module-side contact device and the opening of the first housing region, preferably of the clutch actuator and/or the respective control and/or measurement electronics. The extension of the outer contour of the hybrid module-side contact device is preferably smaller than the extension of the inner contour of the opening, so that the contact device fits through the opening. The hybrid module-side contact device is preferably disposed on an opening of a power electronics housing of the power electronics module. The first housing region is preferably an intermediate wall.

In accordance with a particularly preferred aspect, the opening of the first housing region is covered by a sealing cover including a cable feedthrough. This is a very advantageous feature because in the first region (e.g. the clutch damper space) out of which the cables are guided, the hybrid module housing may be filled with water. The sealing cover is preferably extruded onto the cable, providing a sealed cable feedthrough in the cover. The sealing cover is preferably screwed to the opening.

For assembly purposes, for instance cables including plug and sealing cover preferably extruded thereon are first connected to the clutch actuator and/or the required sensors. The hybrid module-side contact device, preferably one or more plugs of the contact device, is guided outside through the opening in the first housing region. The power electronics-side contact device, preferably one or more bushes, is mounted to a circuit board in the power electronics module. The sealing cover is fixed to the opening.

In a further power electronics module of the invention, the power electronics module is mountable and preferably mounted to a component of the hybrid module, and the hybrid module-side contact device is guidable, preferably guided, into the interior of the power electronics module, preferably through an opening in a first housing region of the hybrid module and/or through a power electronics housing opening of a power electronics housing, and contactable, preferably contacted, by the power electronics module-side contact device. In a further hybrid module of the invention, the hybrid module-side contact device is guidable, preferably guided, into the interior of the power electronics module, preferably through an opening in a first housing region of the hybrid module and/or through a power electronics housing opening of a power electronics housing, and connectable, preferably connected, to the power electronics module-side contact device. In a further method of the invention, the hybrid module-side contact device is guided into the interior of the power electronics module, preferably in a corresponding way, and contacted by the power electronic module-side contact device.

This allows the use of hybrid module-side plugs that are potentially provided using a very short cable, and provides a very simple assembly without any compensatory tolerances.

The component is preferably the hybrid module housing. The region to which the power electronics housing is mounted or mountable on the hybrid module housing preferably comprises a first hybrid module housing wall region that is adjacent to the space for receiving a clutch of the hybrid module. The hybrid module-side contact device is preferably mounted to a cable, and preferably as a plug device, prior to or during assembly. The power electronics module-side contact device is preferably mounted to a circuit board of the power electronics module, preferably as a plug-in device with fitting bushes. During the assembly of the hybrid module and the power electronics, the contacts are preferably plugged in. An assembly-related excess length of the cables is preferably laid in the power electronics module. The interior of the power electronics module is preferably bounded by the region on which the power electronics housing is fixed or fixable to the hybrid module housing and by the power electronics housing.

The power electronics housing opening of the power electronics housing is preferably sealable by means of the hybrid module-side contact device The power electronics housing is preferably arrangeable in a sealing way on a wall region of the component along a sealing contact, preferably a sealing contact surrounding the opening of the first wall region (and a contact for instance established by means of a sealing element), and the power electronics module-side contact device and/or the hybrid module-side contact device is at least partly passed through an opening formed by the sealing contact.

In a further power electronics module of the invention, a power electronics housing opening of the power electronics housing and/or a component opening of a component of the hybrid module is sealable, preferably sealed, by means of the power electronics module-side contact device. In a further hybrid module of the invention, the hybrid module housing includes a second housing region that is preferably at least in regions plate-shaped and/or preferably planar and is equipped for fixing the power electronics module, wherein the hybrid module-side contact device is preferably arrangeable, in particular arranged, on the said housing region.

This also provides an alternative way of using hybrid module-side plugs that are potentially provided. Although this alternative relies on cables, it requires only a very short cable and allows the implementation of a simple assembly without any compensatory tolerances. At the location at which the hybrid module-side contact device is arranged or arrangeable on the second housing region, the second housing region preferably has an opening for the hybrid module-side contact device to pass through to contact the power electronics module-side contact device.

The existing plugs are preferably likewise guided out of the first housing region and subsequently fitted onto the power electronic module-side contact device, preferably one or more bushes, likewise arranged on the second housing region, on the second housing region, preferably a plate, and preferably from the other side. The power electronics module-side contact device is preferably pre-mounted on a circuit board. It preferably has a sealing effect towards the second housing region on the second housing region side facing the power electronics module. Subsequently, the short cables are preferably fixed to the housing. Preferably, the opening in the first housing region sealed by a sealing cover prior to or during assembly. Prior to or during assembly, the power electronics module is preferably mounted to the hybrid module, preferably in the second housing region, in particular along a sealing contact, before the two contacting devices are in contact with one another. In accordance with a particularly preferred aspect, the opening of the first housing region is covered by a sealing cover with a sealed cable feedthrough, and an opening of the second housing region for passing through for contact is sealed towards the exterior and/or towards the interior of the power electronics module by means of the power electronics module-side contact device and/or by means of the hybrid module-side contact device.

In a further hybrid module of the invention, the hybrid module-side contact device is disposed on the second housing region and the first housing region and the second housing region of the hybrid module housing are covered by a third housing region sealing both the opening of the first housing region and the arrangement point of the hybrid module-side contact device on the second housing region towards the exterior. Alternatively, in a further hybrid module of the invention, the first housing region of the hybrid module housing is covered by a third housing region sealing the opening of the first housing region towards the exterior and the hybrid module-side contact device is disposed on the third housing region.

These represent alternatives or additional measures for separately sealing the opening of the first housing for instance by means of a sealing cover.

In accordance with a preferred feature, there is a connection contact between the contact devices inside the hybrid module housing. The hybrid module-side contact device preferably does not have any cables outside the housing. It preferably includes a box header. The contact devices are preferably in contact with one another or are brought into contact with one another by means of plug-in connections of lead frames. In accordance with a preferred feature, a corresponding bush housing is pre-mounted on the circuit board of the power electronics module. In accordance with a preferred feature, it has or forms a seal against the housing wall. The plug contacts, preferably including a box header, of the clutch actuator, for instance, and/or of a resolver (rotor rpm or rotor position sensor) are preferably likewise pre-mounted on a recess in the hybrid module housing inside the space sealed by the third housing region. In accordance with a preferred feature, the connections will connect automatically due to suitable guide pins when the hybrid module and the power electronics module are assembled.

In a further power electronics module of the invention, the power electronics module is disposed on a component of the hybrid module, preferably a hybrid module of the invention. In a further hybrid module of the invention, the power electronics module, preferably a power electronics module of the invention, is disposed on a component of the hybrid module.

The invention will now be explained in more detail by way of example and based on drawings.

DETAILED DESCRIPTION

Figure 1:
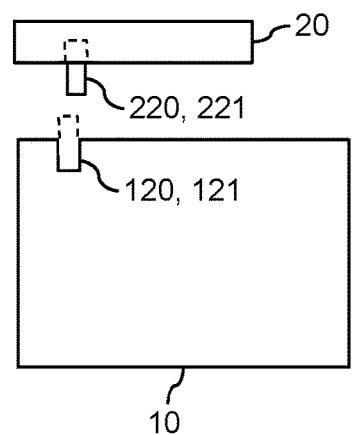
FIG. 1 is a schematic diagram of a hybrid module of the invention and of a power electronics module of the invention, each having an electrical signal and/or clutch actuator connection and associated contact devices.

FIG. 1 is a principal sketch of a hybrid module 10 of the invention and of a power electronics module 20 of the invention, each including an electrical signal and/or clutch actuator connection 120, 220 and associated contact devices 121, 221. The contact devices 221 and 121 may be brought into mutual contact. Preferably at least one, in particular two, of the contact devices 121, 221 are fixed to the respective module, for instance rigidly or at least elastically fixed to the respective housing or an integral part of the respective housing. Contact between the contact devices 121, 221 is on the side of the hybrid module. The dashed lines indicate an alternative in which the contact is on the side of the power electronics module 22.

During assembly of the hybrid module, the contact devices 121 and 221 are brought into contact with one another, preferably by arranging the power electronics module 20 on the hybrid module, for instance by fixing it thereto.

This provides a reliable, conductive, assembly-friendly contact for signals or a clutch actuator between the power electronics module 20 and the hybrid module 10, reducing cabling to a minimum.

Figure 2:
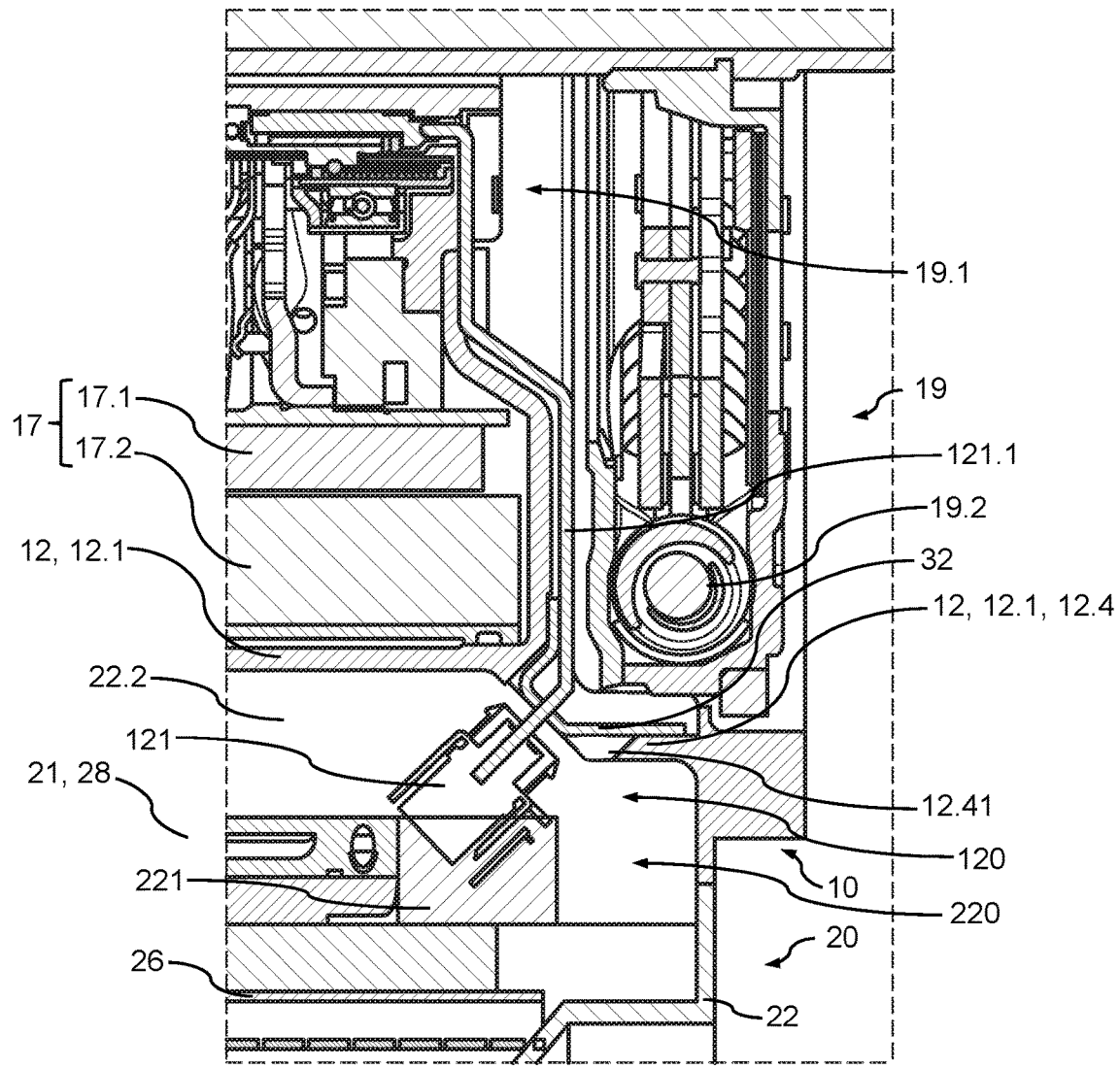
FIG. 2 is a sectional view based on FIG. 1 of a detail of a hybrid module of the invention with one option of the hybrid module-side contact device passing through into the power electronics housing.

Based on FIG. 1, FIG. 2 is a sectional representation of a detail of a hybrid module 10 of the invention indicating an option of passing the hybrid module-side contact device 121 through into the power electronics housing 22. The power electronics module-side contact device 221 is fixed to the power electronics module 20 and is located in the power electronics housing 22. The power electronics module 20 is disposed on a component 12 of the hybrid module; in the illustrated example, the component is the hybrid module housing 12.1 comprising a first wall region 12.4 of the hybrid module housing 12.1. The hybrid module-side contact device 121 is guided out of the first housing region 12.4 through an opening 12.41 in the first housing region 12.4 and into the interior 22.2 of the power electronics module 20 to contact the power electronics module-side contact device 221. The interior 22.2 is bounded by the region on which the power electronics module housing is fixed or fixable to the hybrid module housing, here 12.1 and 12.4, and by the power electronics housing 22. The first housing region 12.4 borders a space receiving a clutch 19 of the hybrid module. The clutch includes a damper system 19.2 that is disposed in the same space as the clutch 19. The hybrid module 10 further includes a clutch actuator 19.1 and an e-motor 17 including a rotor 17.1 and a stator 17.2. The power electronics module 20 includes power electronics 21 as well as control and/or measurement electronics 28 on a circuit board 26, which is likewise disposed in the interior 22.2. The hybrid module-side contact device 121 is connected to a cable end of a cable 121.1, the cable end passing through the opening 12.41 of the first housing region 12.4. The other cable end is connected to the clutch actuator 19.1. The cable is guided along an interior wall of the space in which the clutch 19 is disposed. A sealing cover 32 with a cable feedthrough closes the opening 12.41 and seals the interior 22.2 against a coolant (e.g. air or a cooling liquid) of the clutch 19. The extension of the outer contour of the hybrid module-side contact device 121 is smaller than the extension of the inner contour of the opening 12.41, allowing the contact device to fit through the opening. This sectional view indicates that the inner width of the opening 12.41 in the sectional plane is greater than the height (in a direction perpendicular to the cable guided into the plug at the point of introduction) of the contact device 121. The contact device 121 has one or more plugs and the contact device 221 has one or more bushes.

During assembly, the power electronics module-side contact device 221 is fixed to the power electronics module 20 on the circuit board 26 before the contact devices 121, 221 are connected to one another. The hybrid module-side contact device 121 is guided into the interior 22.1 through the opening 12.41 and fitted onto the power electronics module-side contact device 221. The opening 12.41 is closed by means of the sealing cover 32. Subsequently, the power electronics housing 22 is fixed to the hybrid module housing 12.1. Any excess length of cable 121.1 is arranged in the power electronics module 20. The area surrounding the opening 12.42 acts as a sealing area.

Figure 3:
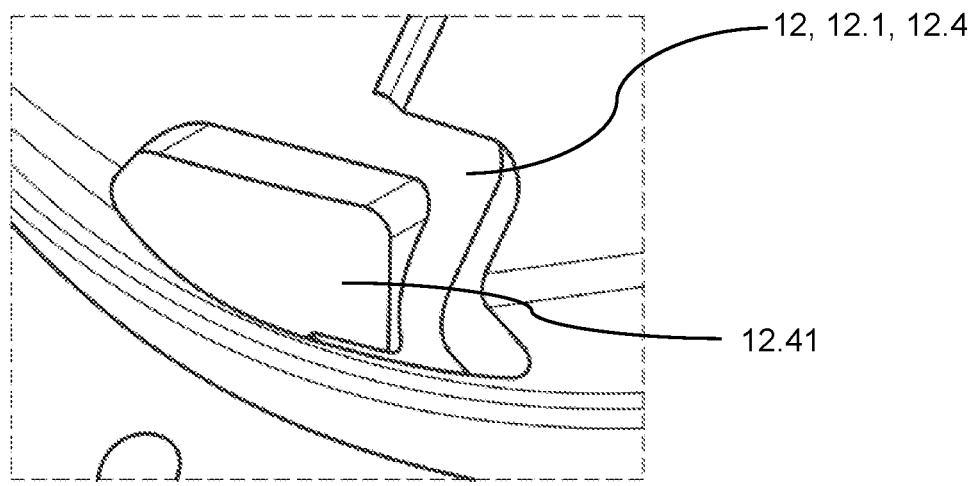
FIG. 3 is a perspective sectional view of an opening of the first hybrid module housing wall region of FIG. 2.

FIG. 3 is a perspective sectional view of an opening 12.41 of the first hybrid module housing wall region of FIG. 2 as viewed from the interior 22.1, with the sealing cover of FIG. 2 not shown.

The alternative shown in FIGS. 2 and 3 allows the use of a hybrid module-side plug that is potentially provided. In addition, no compensation for tolerances is required (e.g. if the power electronics housing 22 is not mounted to the hybrid module housing 12.1 exactly as envisaged).

Figure 4:
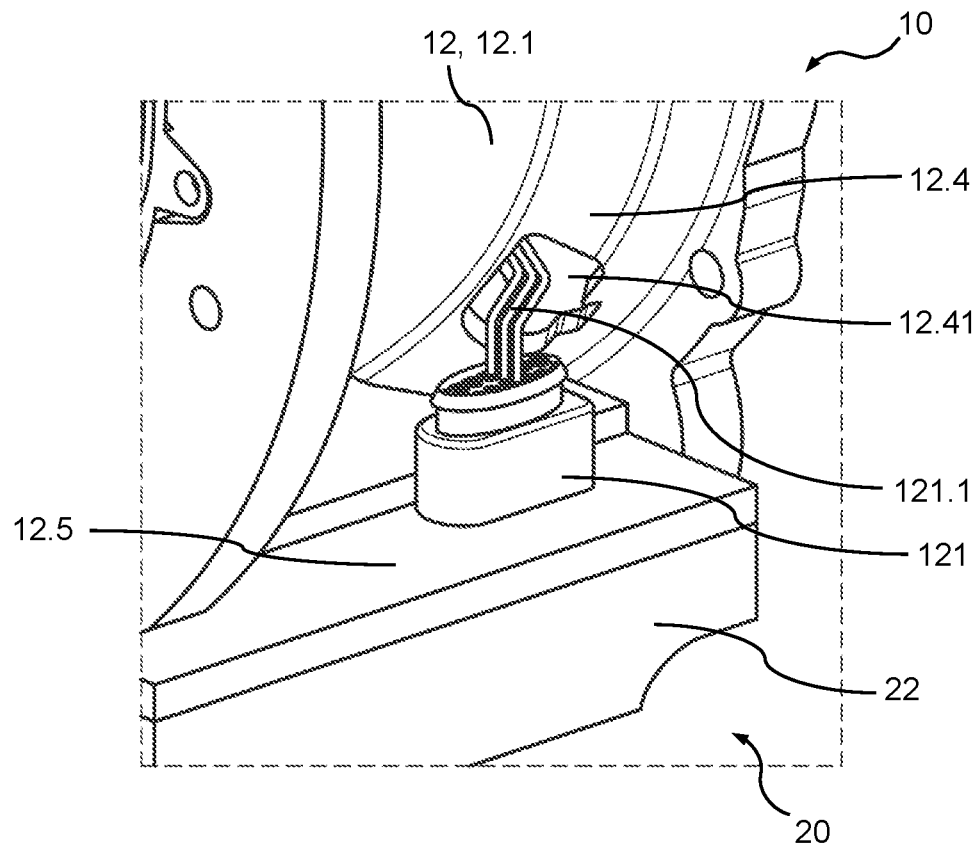
FIGS. 4 and 5 are partly sectional perspective representations of a detail of a hybrid module of the invention and of a power electronics module of the invention wherein the hybrid module-side contact device is disposed on a second housing region of the hybrid module housing.
Figure 5:
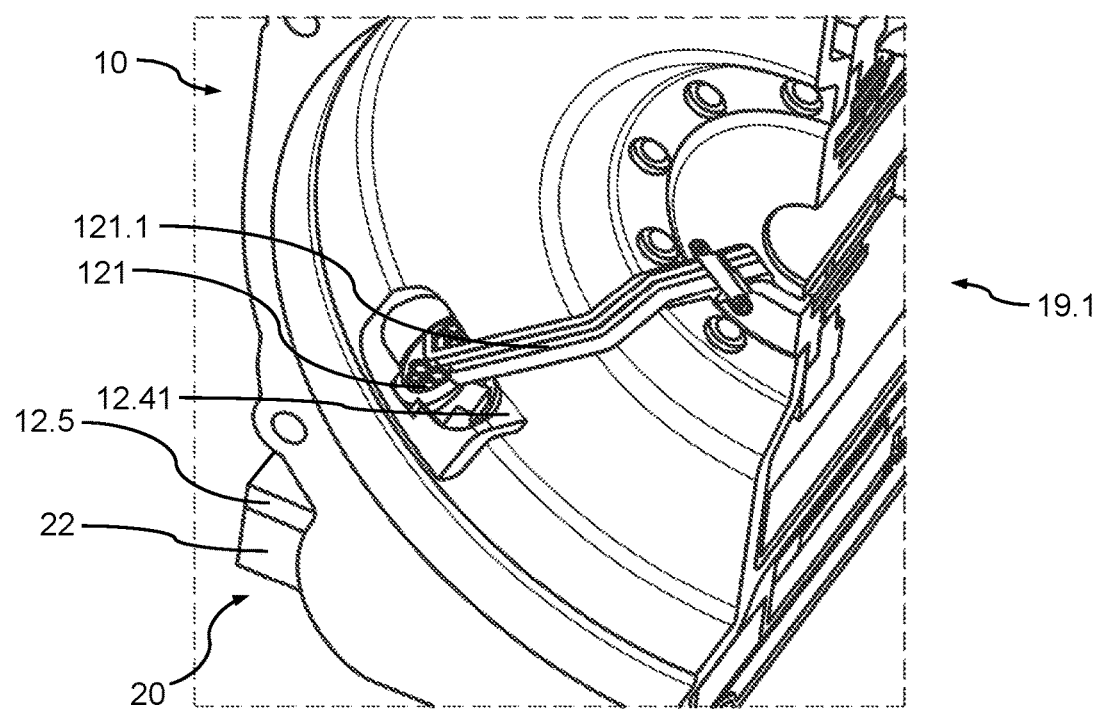
Figure 6:
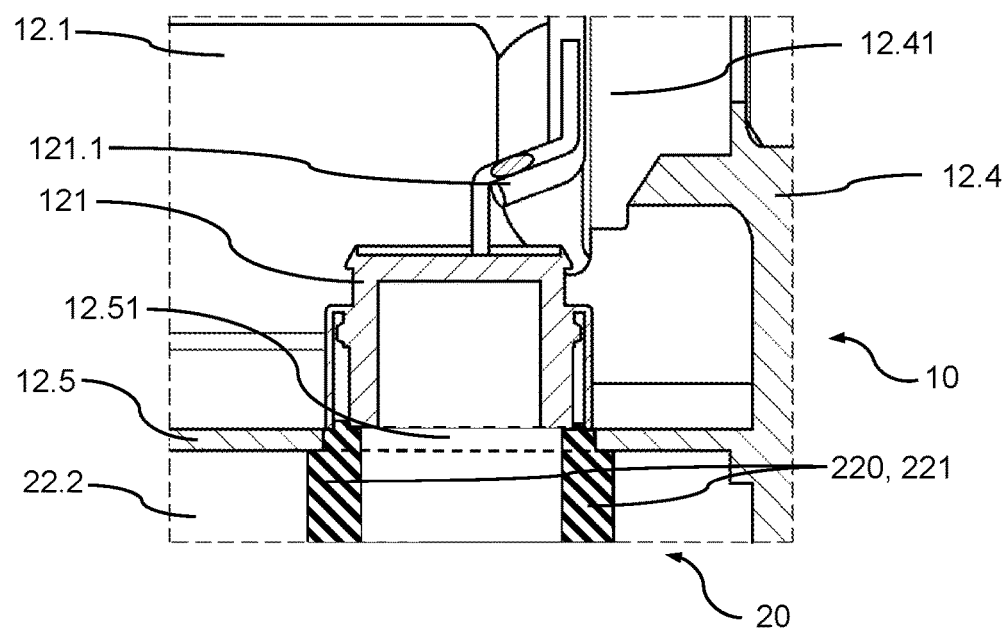
FIG. 6 is a sectional view thereof.

FIGS. 4 and 5 are perspective, partly sectional views of details of a hybrid module 10 of the invention and of a power electronics module 20 of the invention and FIG. 6 is a sectional view thereof, with the same components as in FIGS. 1 to 3 but with the hybrid module-side contact device 121 disposed on a second housing region 12.5 of the hybrid module housing 12.1 as opposed to FIGS. 2 and 3. The second housing region 12.5 is a plate located at the bottom of the hybrid module 10. The passage of the contact device 121 through the opening 12.41 is implemented in the same way as in FIGS. 2 and 3; a sealing cover is not shown. FIG. 4 is a view from outside; FIG. 5 is a view of an inner wall of the space receiving the clutch with the cable 121.1 to the clutch actuator 19.1 running along the inner wall (as it is also shown in the sectional view of FIG. 2). The cable 121.1 is a triple-pole cable. FIG. 6 illustrates the connection between the contact device 121 and the second housing region 12.5. The contact device 221 seals an opening 12.51 of the second housing region 12.5.

During assembly, the contact device 221 is fixed to the circuit board of the power electronics module 20. The contact device 121 is guided out of the first housing region 21.4 and onto the second housing region 12.5. By arranging the power electronics module 20 on the second housing region 12.5, the opening 12.51 of the second housing region 12.5 is sealed against the interior 22.1 by the contact device 221. Contact between the contact devices 121 and 221 is established either by first fixing the contact device 121 to the second housing region 12.5 and then fixing the power electronics module 20 to the second housing region 21.5 or by first fixing the power electronics module 20 to the second housing region 12.5 and then arranging the contact device 121 on the second housing region 12.5, e.g. by plugging it into the contact device 221 that is already disposed on the other side of the opening 21.51 and/or by fixing it thereto or to the second housing region 21.5.

The alternative shown in FIGS. 4 to 6 provides an alternative way of using a hybrid module-side plug that is potentially provided. In addition, no compensation for tolerances is required (e.g. if the power electronics housing 22 is not mounted to the hybrid module housing 12.1 exactly as envisaged).

Figure 7:
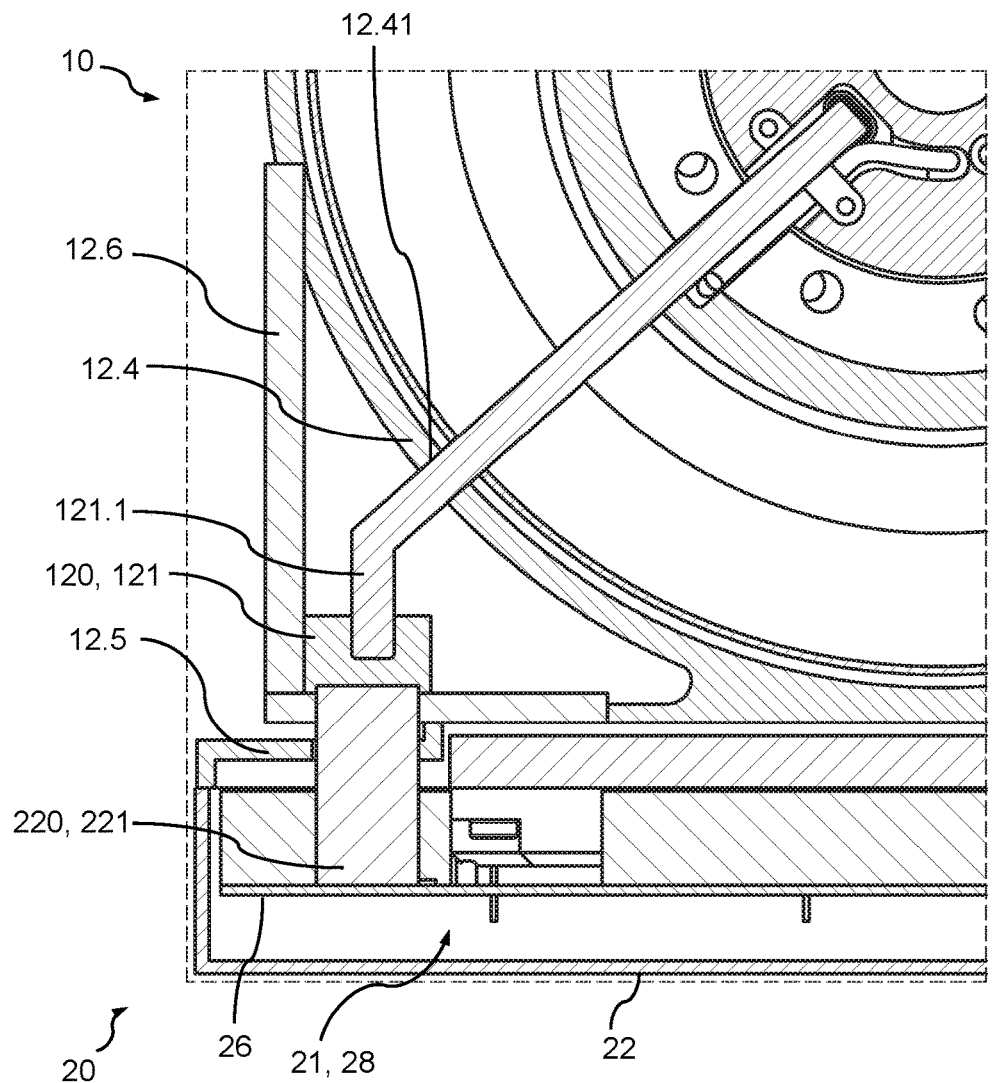
FIG. 7 is a sectional view of a detail of a hybrid module of the invention and of a power electronics module of the invention wherein the first housing region is covered by third housing region sealing the opening of the first housing region.

FIG. 7, partly based on FIGS. 4-6, is a sectional view of a detail of a hybrid module 10 of the invention and of a power electronics module 20 of the invention wherein the first housing region 12.4 is covered by a third housing region 12.6 sealing the opening 12.41 towards the outside. The hybrid module-side contact device 121 has no cables outside the hybrid module housing 12.1. The contact devices 121, 212 have plug-in/bush connections in the form of lead frames and are in contact with one another. A seal is preferably formed on the contact device 221 against the housing wall in the third housing region 12.6 and preferably against the housing wall in the second housing region 12.5. The contact device 121 is preferably pre-mounted on an opening 12.61 of the third housing region 12.6 and is for instance screwed on with a seal. Thus both contact devices 121, 221 are fixed to the respective module 10, 20.

When the hybrid module 10 and the power electronics module are assembled, the connections are established automatically due to suitable guide pins.

This in particular allows dispensing with a sealing by means of a sealing cover.

Figure 8:
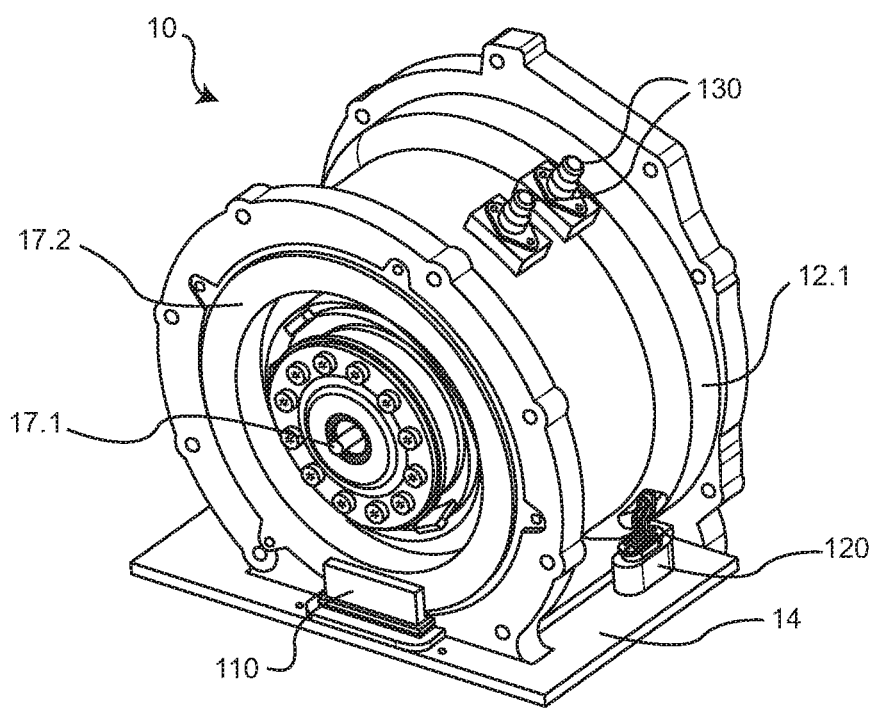
FIG. 8 is a perspective view of a hybrid module of the invention prior to assembly.

FIG. 8 is a perspective view of a hybrid module 10 of the invention, based on FIG. 1 or any other of the previous figures, prior to assembly. Connections sealed against the hybrid module interior are provided on the wall region 14 that corresponds to the second housing region 12.5: a hybrid module-side e-motor power connection 110 and a hybrid module-side electrical signal and/or clutch actuator connection 120. The hybrid module 10 further includes two hybrid module-side coolant connections 130. In addition, the figure also shows the rotor 17.1 and the stator 17.2 of the hybrid module 10.

A power electronics module 20, for instance the one shown in FIG. 2, 4, 5, 6, or 7, may easily be arranged in a space-saving manner radially outside the rotor 17.1 and stator 17.2 on this hybrid module 10.

Figure 9:
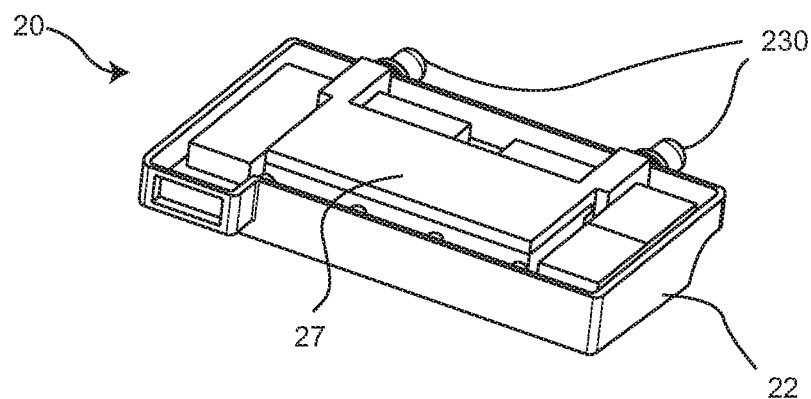
FIG. 9 is a perspective view of a power electronics module of the invention, preferably for the hybrid module shown in FIG. 8.

Based on FIG. 1 or any other of the previous figures, FIG. 9 is a perspective view of a power electronics module 20, preferably of the hybrid module 10 shown in FIG. 8, prior to assembly. It includes a cooling device 27, which is disposed between two cooling connections 230 inside the power electronics housing 22 on a circuit board side facing the hybrid module. The power electronics are covered by the cooling device 27.

The present invention relates to the signal/clutch actuator interface(s), in particular to low-voltage interfaces between hybrid module and power electronics module. The power electronics module is disposed immediately below the hybrid module. In this way, new connections between the power electronics module and the low-voltage components of the hybrid module are possible. The invention in particular envisages three options:

1. Guiding the cables and plugs of the low-voltage cables through the housing wall of the hybrid module and into the power electronics housing. The passage(s) is (are) to be sealed in a suitable way. The cables may be stowed away in the power electronics housing.
2. The cables are guided through the housing wall of the hybrid module to the power electronics module or a housing region of the hybrid module and there they are plugged into a bush. Excess cable is preferably fixed to the hybrid module housing. The power electronics housing does not need to be opened for assembly.
3. Cables and plug-in connections are pre-mounted on a lead frame in the hybrid module and are guided on an intermediate wall inside the hybrid module housing. The corresponding bush housings are pre-mounted on a circuit board in the power electronics module; if desired, bushes and plug-in contacts between the power electronics module and the hybrid module may automatically connect during assembly due to guide pins.

LIST OF REFERENCE NUMERALS

10 hybrid module
12 component
12.1 hybrid module housing
12.4 first housing region receiving the clutch of the hybrid module
12.41 opening of the first housing region
12.5 second housing region for fixing the power electronics module
12.51 opening of the second housing region
12.6 third housing region
12.61 opening of the third housing region
14 wall region of the component
17 e-motor
17.1 rotor
17.2 stator
19 clutch
19.1 clutch actuator
19.2 damper system
20 power electronics module
21 power electronics
22 power electronics housing
22.2 interior of the power electronics module
26 circuit board
27 cooling device
28 control and/or measuring electronics
32 sealing cover
110 hybrid module-side e-motor power connection
120 hybrid module-side electrical signal and/or clutch actuator connection
121 hybrid module-side contact device
121.1 cable
130 hybrid module-side coolant connection
220 power electronics module-side electrical signal and/or clutch actuator connection
221 power electronics module-side contact device
230 power electronics module-side coolant connection

What is claimed is:

1. An assembly for a hybrid drive unit comprising:
    a hybrid module for the hybrid drive unit, the hybrid module including a hybrid module housing, an electric motor in the hybrid module housing and a clutch in the hybrid module housing, the hybrid module further comprising a hybrid module-side electrical contact device providing a hybrid module-side electrical signal or clutch actuator connection; and
    a power electronics module for operating the hybrid module, comprising:
        a power electronics module-side electrical signal or clutch actuator connection that includes a power electronics module-side electrical contact device for a direct connection to the hybrid module-side electrical contact device outside of the hybrid module housing,
    the hybrid module housing including a wall region bordering a space receiving the clutch, the hybrid module including an electrical cable electrically connected to the hybrid module-side electrical contact device and extending in the space receiving the clutch and through the wall region, a first end of the electrical cable being fixed directly to the hybrid module-side electrical contact device.

2. The assembly as recited in claim 1 wherein the power electronics module-side electrical contact device is fixed to the power electronics module.

3. The assembly as recited in claim 1 wherein the power electronics module is arrangeable on a component of the hybrid module and electrical contact is establishable between the power electronics module-side electrical contact device and the hybrid module-side electrical contact device by arranging the power electronics module on the component.

4. The assembly as recited in claim 1 wherein the power electronics module-side electrical contact device is at least partly located in a power electronics housing of the power electronics module.

5. The assembly as recited in claim 4 wherein the power electronics module is arrangeable on a component of the hybrid module and wherein the hybrid module-side electrical contact device is guidable into an interior of the power electronics module and electrical contact is establishable with the power electronics module-side electrical contact device.

6. The assembly as recited in claim 1 wherein a power electronics housing opening of a power electronics housing or a component opening of a component of the hybrid module is sealable by the power electronics module-side electrical contact device.

7. The assembly as recited in claim 1 wherein the power electronics module is disposed on a component of the hybrid module.

8. The assembly as recited in claim 1 wherein the cable extends through a hole in the wall region.

9. The assembly as recited in claim 8 further comprising a sealing cover at the hole sealing the housing, the cable passing through the sealing cover.

10. The assembly as recited in claim 1 wherein the clutch includes a damper system, the cable extending radially inward in a space that is axially between the damper system and the electric motor.

11. The assembly as recited in claim 1 wherein the clutch includes a clutch actuator inside of the electric motor, a second end of the cable being inside of the electric motor and connected to the clutch actuator.

12. The assembly as recited in claim 11 wherein the electric motor includes a rotor and a stator, the clutch actuator being inside of the rotor and the stator, the power electronics module-side electrical contact device being connected to the hybrid module-side electrical contact device radially outside of the rotor and the stator.

13. The assembly as recited in claim 8 wherein an outer contour of the hybrid module-side electrical contact device is smaller than an inner contour of the hole in the wall region such that the hybrid module-side electrical contact device is passable through the opening.

14. An assembly for a hybrid drive unit comprising:
a hybrid module for the hybrid drive unit; and
a power electronics module for operating the hybrid module, comprising:
  a power electronics module-side electrical signal or clutch actuator connection that includes a power electronics module-side electrical contact device; and
the hybrid module comprising:
  an electric motor, a clutch and a hybrid module-side electrical signal and clutch actuator connection that includes a hybrid module-side electrical contact device for a direct connection to the power electronics module-side electrical contact device, the power electronics module being sealed from a coolant of the clutch by at least one seal,
  the hybrid module housing including a wall region bordering a space receiving the clutch, the hybrid module including an electrical cable electrically connected to the hybrid module-side electrical contact device and extending in the space receiving the clutch and through the wall region, a first end of the electrical cable being fixed directly to the hybrid module-side electrical contact device.

15. The assembly recited in claim 14 wherein the wall region forms a first housing region out of which the hybrid module-side electrical contact device is guidable through an opening of the first housing region.

16. The assembly as recited in claim 15 wherein the hybrid module housing has a second housing region equipped for fixing the power electronics module.

17. The assembly as recited in claim 16 wherein the hybrid module-side electrical contact device is disposed on the second housing region and wherein the first housing region of the hybrid module housing and the second housing region are covered by a third housing region sealing both the opening of the first housing region and a fixing location of the hybrid module-side electrical contact device on the second housing region towards an outside of the hybrid module housing.

18. The assembly as recited in claim 15 wherein the first housing region of the hybrid module housing is covered by a third housing region covering the opening of the first housing region towards an outside of the hybrid module housing and wherein the hybrid module-side electrical contact device is disposed on the third housing region.

19. A method for assembling a hybrid module for a hybrid drive unit, comprising:
providing the hybrid drive unit, the hybrid module including a hybrid module housing, an electric motor in the hybrid module housing and a clutch in the hybrid module housing, the hybrid module further comprising a hybrid module-side electrical contact device providing a hybrid module-side electrical signal or clutch actuator connection; and
directly connecting a power electronics module-side electrical contact device, connected to a power electronics module, of a power electronics module-side electrical signal or clutch actuator connection to the hybrid module-side electrical contact device outside of the hybrid module housing,
the hybrid module housing including a wall region bordering a space receiving the clutch, the hybrid module including an electrical cable electrically connected to the hybrid module-side electrical contact device and extending in the space receiving the clutch and through the wall region, a first end of the electrical cable being fixed directly to the hybrid module-side electrical contact device.

20. The method as recited in claim 19 wherein the directly connecting the power electronics module-side electrical contact device to the hybrid module-side electrical contact device includes guiding the hybrid module-side electrical contact device out through the hybrid module housing through an opening in the wall region and then fitting the hybrid module-side electrical contact device onto the power electronics module-side electrical contact device.

* * * * *